(12) United States Patent
Muquet et al.

(10) Patent No.: US 7,835,458 B2
(45) Date of Patent: Nov. 16, 2010

(54) METHOD OF DECODING A SPATIALLY MULTIPLEXED SIGNAL AND ITS CORRESPONDING RECEIVER

(75) Inventors: Bertrand Muquet, Paris (FR); Hikmet Sari, Charenton (FR)

(73) Assignee: Sequans Communications, Paris la Defense Cedex (FR)

( * ) Notice: Subject to any disclaimer, the term of this patent is extended or adjusted under 35 U.S.C. 154(b) by 862 days.

(21) Appl. No.: 11/784,533

(22) Filed: Apr. 5, 2007

(65) Prior Publication Data

US 2007/0268813 A1 Nov. 22, 2007

(30) Foreign Application Priority Data

Apr. 5, 2006 (EP) .................................. 06290555

(51) Int. Cl.
*H04L 5/12* (2006.01)
(52) U.S. Cl. ........................ 375/262; 375/316; 375/341
(58) Field of Classification Search ......... 375/261–262, 375/341, 316
See application file for complete search history.

(56) References Cited

U.S. PATENT DOCUMENTS

2005/0074068 A1* 4/2005 Borran et al. ................ 375/264
2005/0270939 A1* 12/2005 Kashihara et al. ........ 369/47.53
2008/0063104 A1* 3/2008 Gardner et al. .............. 375/262

FOREIGN PATENT DOCUMENTS

EP 1 592 191 A 11/2005
WO WO 01/95531 A 12/2001

OTHER PUBLICATIONS

Monisha Shosh et al., "Reduced-Complexity ML Detection for Coded MIMO Systems Using an Absolute-Value Search", Acoustics, Speech, and Signal Processing, 2005. Proceedings. (ICASSP '05). IEEE International Conference on Philadelphia, PA, USA, Mar. 18-23, 2005, Piscataway, NJ, USA, IEEE, Mar. 18, 2005, pp. 1025-1028, XP010792424.
"Layered Space-Time Architecture for Wireless Communication in a Fading Environment when Using Multi-Elements Antennas", Bell Labs Technology Journal, Autumn 1996.
European Search Report for EP 06 29 0555 dated Aug. 25, 2006.

* cited by examiner

*Primary Examiner*—Emmanuel Bayard
(74) *Attorney, Agent, or Firm*—Dylan O. Adams; Graybeal Jackson LLP

(57) ABSTRACT

An embodiment of a method for decoding a received signal function of at least a channel matrix B, and of a first and second symbols S1, and S2 belonging to a signal constellation. The method comprises the steps of: selecting a set of values of the first symbol S1 in the signal constellation; for each selected value of the first symbol S1: estimating the value of the second symbol S2 to generate an estimated value of the second symbol; calculating an Euclidean distance between the received signal and a noiseless signal defined by the first symbol with said selected value and by the second symbol with said estimated value; selecting the minimal Euclidean distance among the Euclidean distances respectively calculated for the different selected values of the set of possible values of the first symbol; and selecting decoded first and second symbols corresponding to the selected minimum Euclidean distance.

20 Claims, 3 Drawing Sheets

METHOD OF DECODING A SPATIALLY MULTIPLEXED SIGNAL AND ITS CORRESPONDING RECEIVER

PRIORITY CLAIM

This application claims priority from European patent application No. 06290555.9, filed Apr. 5, 2006, which is incorporated herein by reference.

TECHNICAL FIELD

An embodiment of the present invention relates to wireless communication systems using multi-antennas techniques, commonly referred to as Multi-Input Multi-Output techniques and noted MIMO.

More precisely, a first embodiment of the invention relates to a method of decoding a received signal function at least of a noise term matrix, of a channel matrix, and of a first and second symbols belonging to at least a signal constellation.

A second embodiment of the invention relates to a corresponding receiver.

BACKGROUND

Multi-antennas techniques have become very popular to increase the throughput and/or the performance of wireless communications systems, especially in third-generation mobile communications networks, in new generations of wireless local area networks like Wi-Fi (Wireless Fidelity), and in broadband wireless access systems like WiMAX (Worldwide Interoperability for Microwave Access).

In MIMO systems, transmitter Tx, as well as receiver Rx are equipped with multiple antennas. As illustrated in FIG. 1, the transmitter Tx and the receiver Rx are both equipped, for example, with respectively a first and a second transmit antennas, Tx1 and Tx2, and a first and a second receive antennas, Rx1 and Rx2.

Among the numerous schemes proposed in the literature for transmissions using multiple antennas, spatial multiplexing model is one of the most popular ones which have been included in the specification of the WiMAX standard based on OFDMA (Orthogonal Frequency-Division Multiple Access).

In spatial multiplexing for transmission over two transmit antennas, Tx1 and Tx2, a signal s is fed into the transmitter Tx, which performs, for example, coding and modulation to provide two independent complex modulation symbols: a first symbol $s_1$ and a second symbol $s_2$. Each symbol belongs to a given signal constellation according to the modulation technique used, as well known by skilled in the art person. These two symbols, $s_1$ and $s_2$, are then simultaneously and respectively transmitted on the first and second transmit antennas, Tx1 and Tx2, during a time slot t corresponding to a given symbol period, through a channel defined by its channel matrix H. The transmit signal s can be expressed mathematically in a vector form, as it is exactly done for example in the WiMAX standard specification, as:

$$s = \begin{bmatrix} s_1 \\ s_2 \end{bmatrix}.$$

At the receiver side, the symbols are captured by the two receive antennas, Rx1 and Rx2, and demodulation and decoding operations are performed. The received signal y, received during time slot t, can be theoretically expressed in matrix form as:

$$y = \begin{bmatrix} y_1 \\ y_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} = Hs + n, \quad (1)$$

where:
- $y_1$ and $y_2$ respectively represent the signals received on the first and the second receive antennas;
- $n_1$ and $n_2$ respectively represent the noise terms affecting the signals on the first and second receive antenna; and
- the coefficients $h_{ij}$ represent the propagation channel response (attenuation and phase) between the $j^{th}$ transmit antenna Txj and the $i^{th}$ receive antenna Rxi, j and i being integers.

To recover the transmitted signal s from the received signal y, the receiver Rx seeks, among all the possible transmitted symbols belonging to the signal constellation used at the transmitter side for the first symbol $s_1$ and the second symbol $s_2$, the most probable transmitted signal $\hat{s}$ given the received signal y.

Such a model is very general and encompasses in particular:

- Single-carrier transmission using spatial multiplexing such as for instance the BLAST (Bell-Labs Layered Space-Time) system described in the article entitled "layered space-time architecture for wireless communication in a fading environment when using multi-elements antennas", in Bell Labs Technology Journal, Autumn 1996, which is incorporated by reference.
- OFDM (Orthogonal Frequency Division Multiplexing) and OFDMA transmissions using spatial multiplexing in which case the model applies on a subcarrier per subcarrier basis;
- CDMA (Code Division Multiple Access) transmissions using spatial multiplexing in which case the model applies for instance after classical rake receiver.

Further, the description focuses on devices capable of receiving such spatially multiplexed signals.

Designing practical receivers for signals transmitted using the spatial multiplexing remains a real challenge. Indeed, designing an optimal receiver, that is to say a receiver minimizing the probability of decoding error on an estimated transmitted signal, is not trivial to be done in practice though its solution can be very simply stated: the most probable transmitted signal $\hat{s}$ given the received signal y is the one minimizing the following Euclidean norm $m(s)=\|y-Hs\|^2$ (2).

Let us note $$\hat{s} = \begin{bmatrix} \hat{s}_1 \\ \hat{s}_2 \end{bmatrix},$$

where $m(\hat{s})=\|y-H\hat{s}\|^2$ is the minimum of the Euclidean norm m(s) and, $\hat{s}_1$ and $\hat{s}_2$ are respectively the most probable transmitted first and second symbols.

This minimization can theoretically be achieved by using the Maximum Likelihood (ML) method, which includes performing an exhaustive search over all the possible transmitted symbols belonging to the signal constellation, to find the most probable transmitted signal $\hat{s}$ minimizing the Euclidean norm.

But this requires a receiver capable of testing $M^2$ symbols hypotheses, where M is the size of the signal constellation used at the transmitter Tx side for the first and second symbols $s_1$ and $s_2$, and unfortunately, this becomes rapidly impossible or impractical due to the huge number of hypotheses to be tested. For instance, 4096 and 65536 hypotheses have to be tested for respectively a 64-QAM (Quadrature Amplitude Modulation) and 256-QAM constellations.

Several receivers have been proposed in the literature to try to solve this intricate problem at a reasonable complexity, yet all suffer from rather limited performance.

Among the most important ones, several receivers are based on interference cancellation approaches, or on iterative detection.

For example, the application US2005/0265465 concerning "MIMO decoding" and which is incorporated by reference, proposes a receiver which decodes iteratively the symbols sent via each transmit antenna. In each stage of processing, the receiver estimates a first symbol, removes the estimated first symbol of the received signal to give a first interference-cancelled received signal, soft-estimates a second symbol from the first interference-cancelled received signal, and provides a symbol estimate error term, for example by computing the probability of error in decoding the symbols. The decoding may be iterated a number of times.

But the performance of such a receiver is far from optimal since it is prone to error propagation phenomenon, and tends to increase the latency of the decoder since the decoder shall perform several decoding passes before providing an estimate of the transmitted signal.

SUMMARY

One embodiment of the invention is a method and a receiver exempt from at least one of the drawbacks previously mentioned. In particular, the proposed embodiment is substantially a method and a receiver capable of optimally receiving a spatially multiplexed signal with neither implementing an exhaustive search nor sacrificing optimality as in prior art techniques.

For this purpose, an embodiment of the invention is a method of decoding a received signal function at least of a noise term matrix, of a channel matrix, and of a first and second symbols belonging to at least a signal constellation.

The channel matrix comprises a first and a second columns, said first column comprising components representing the propagation channel response (attenuation and phase) between a first transmit antenna and at least a first and a second receive antennas, said second column comprising components representing the propagation channel response between a second transmit antenna and at least the first and second receive antennas.

A method according to an embodiment of the invention comprises at least the steps of:
  selecting a set of possible values of the first symbol belonging to the signal constellation;
  for each selected value of the first symbol performing the steps of:
    estimating the value of the second symbol using the value of the first symbol, to generate an estimated value of the second symbol given the first one; and
    calculating an Euclidean distance between the received signal and a virtually received signal defined by the first symbol with said selected value and by the second symbol with said estimated value;
  selecting the minimal Euclidean distance among the Euclidean distances respectively calculated for the different selected values belonging to the set or a subset of said set; and
  selecting decoded first and second symbols as a function of the selected minimum Euclidean distance.

Therefore, the complexity of the method, according to an embodiment of the invention, is only linear in the constellation size rather than exponential.

The method can be used with different constellations, and with an arbitrary number of receive antennas.

The method may further comprise, before performing the step of estimating the value of the second symbol, at least the steps of:
  calculating a first quantity equal to the complex conjugate of the second column multiplied by the received signal;
  calculating a second quantity equal to the complex conjugate of the second column multiplied by the first column; and
  calculating a third quantity equal to the complex conjugate of the second column multiplied by said second column.

Preferably, the step of estimating the value of the second symbol comprises at least the steps of:
  generating an intermediate signal representative of the received signal in which the contribution of the first symbol is subtracted; and
  taking a decision on the value of the second symbol according to the intermediate signal.

For example, the decision on the value of the second symbol is taken by sending the intermediate signal to a threshold detector, which generates the estimated value of the second symbol according to the intermediate signal.

For example, the decision on the value of the second symbol is taken by using a look-up table to find the estimated value of the second symbol.

The set may include all the values of the first symbol belonging to the signal constellation.

The set may be selected inside a sphere belonging to the signal constellation, centered on the received signal and the radius of which is equal to a predefined value $\rho$.

The sphere may be such that $|s_1-\epsilon_1|^2 \leq \rho^2 |l_{22}|^2$, $l_{22}$ being the component of the last line and column of an upper triangular matrix obtained by performing at least a QR decomposition of the channel matrix, $\epsilon_1$ being a component of a vector equal to the inverse of the channel matrix multiplied by the received signal, and $s_1$ being the value of the first symbol.

The first symbol may be defined by a plurality of symbolic bits, each symbolic bit being designated by its rank and being equal to 0 or 1.

The step of selecting the minimal Euclidean distance may be performed for a plurality of subsets, each subset including all the possible values of the first symbol in which the symbolic bit of a predetermined rank has a predetermined value.

The method may further comprise the steps of:
  calculating a first soft symbol $$s_1^{soft} = \frac{c_1^H y - c_1^H c_2 s_2^{ML}}{c_1^H c_1}, c_1^H$$

being the complex conjugate of the first column, and $s_2^{ML}$ being the value of the second symbol corresponding to said estimated value;

calculating a second soft symbol $$s_2^{soft} = \frac{c_2^H y - c_2^H c_1 s_1^{ML}}{c_2^H c_2}, c_2^H$$

being the complex conjugate of the second column, and $s_1^{ML}$ being the value of the first symbol corresponding to said estimated value, $c_2$ and $c_1$ being respectively the first and second columns, and y being the received signal.

Therefore, a method according to an embodiment of the invention may be implemented with a more reduced complexity by sacrificing optimality.

Another embodiment of the invention is a receiver implementing one or more of the embodiments of the methods described above.

Thus, spatially multiplexed signals may be received optimally, and a method being not iterative, it does not increase the receiver latency as iterative receivers do.

BRIEF DESCRIPTION OF THE DRAWINGS

Features and advantages of one or more embodiments of the invention will appear more clearly from the following description, given by way of example only, with reference to the accompanying drawings, wherein.

DETAILED DESCRIPTION

Figure 1:
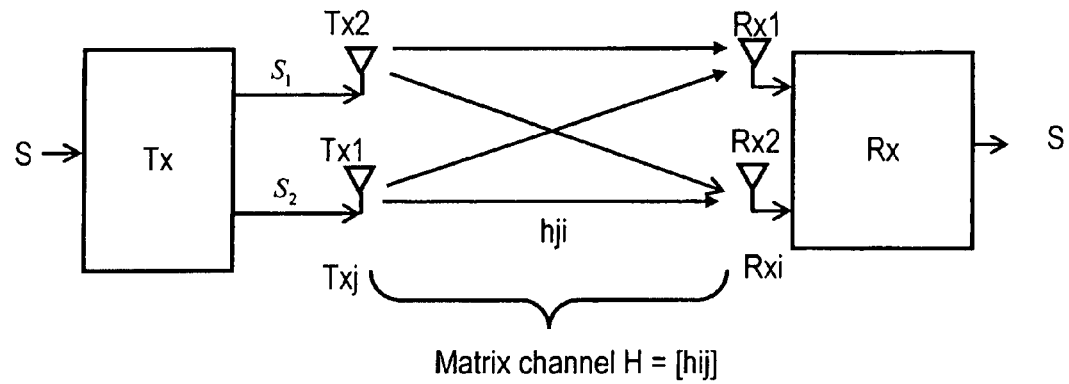
FIG. 1 is a diagram of a multi-antennas wireless communication system.

In a wireless communication, in which receiver Rx and transmitter Tx are equipped, for example, with respectively two receive antennas Rx1, Rx2 and two transmit antennas Tx1, Tx2, as illustrated in FIG. 1, the receiver Rx contains a spatial multiplexer decoder that is capable of performing the detection of a spatially multiplexing signal.

To describe the spatial multiplexing decoding according to an embodiment of the invention, let $$c_1 = \begin{bmatrix} h_{11} \\ h_{21} \end{bmatrix} \text{ and } c_2 = \begin{bmatrix} h_{12} \\ h_{22} \end{bmatrix}$$

designate respectively a first and second columns of the channel matrix H.

With this notation, equation (1) can be rewritten as:

$$y = c_1 s_1 + c_2 s_2 + n \quad (3);$$

and equation (2) becomes:

$$m(s_1, s_2) = \|y - c_1 s_1 - c_2 s_2\|^2 \quad (4).$$

Figure 2:
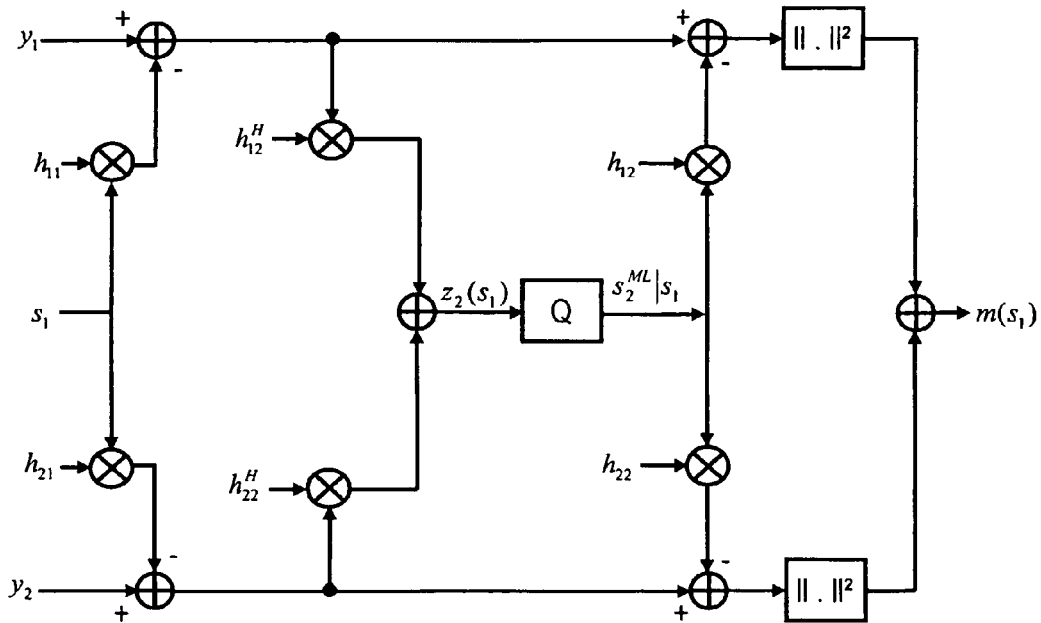
FIG. 2 shows a conceptual bloc diagram of a part of the receiver according to a first embodiment of the invention.
Figure 4:
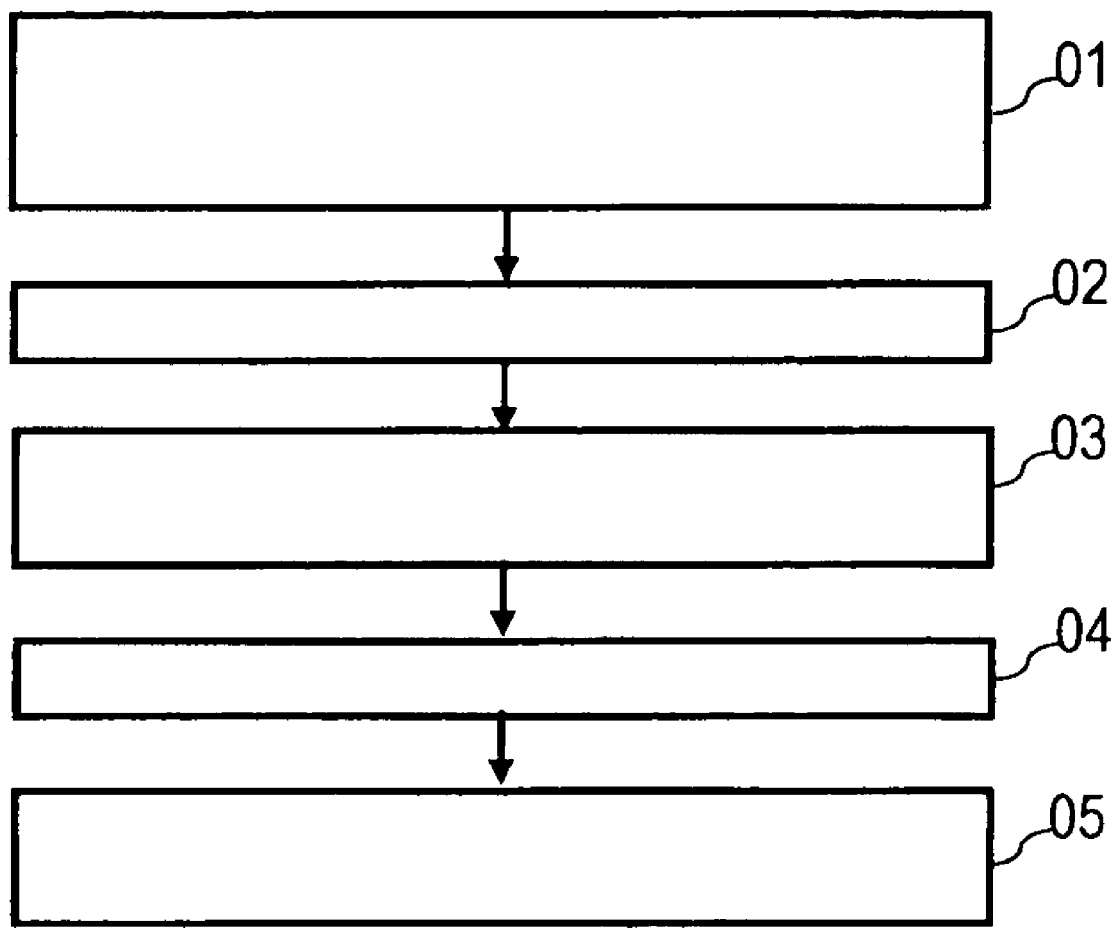
FIG. 4 is a flow chart showing the general steps to be performed according to an embodiment of the invention.

According to a first embodiment of the invention, and referring to FIGS. 2 and 4, the complexity of the Maximum Likelihood (ML) receiver can be reduced by seeking the Maximum Likelihood (ML) estimate of the second symbol $S_2$ for each value of the first symbol $s_1$ belonging to the signal constellation, without having to make an exhaustive search.

This can be performed as follows: for each of the M possible values of the fist symbol $s_1$, subtract the contribution of this first symbol to the received signal y, for example by computing:

$$r_2(s_1) = y - c_1 s_1 \quad (5).$$

This signal can be expressed in terms of second symbol $s_2$ as:

$$r_2(s_1) = c_2 s_2 + n \quad (6).$$

Thus, to make a decision on the second symbol $s_2$, that is to say to estimate (02) the value of the second symbol $s_2$ from equation (6), we next compute an intermediate signal:

$$z_2(s_1) = c_2^H r_2(s_1) = c_2^H y - c_2^H c_1 s_1 \quad (7),$$

where the superscript H denotes complex conjugate. Equation (7) can then be expressed as:

$$z_2(s_1) = c_2^H c_2 s_2 + c_2^H n = \|c_2\|^2 s_2 + c_2^H n \quad (8),$$

The decision on the second symbol $s_2$ is made by sending the intermediate signal $z_2(s_1)$, for example, to a threshold detector Q, also called symbol detector or threshold comparator, as well known by skilled in the art person, to generate an estimated value of the second symbol $s_2$ according to the intermediate signal $z_2(s_1)$.

The decision on the second symbol $s_2$ can also be achieved by using a simple look-up table, though the invention is not limited to these particular implementations.

In this way, for each possible value of the first symbol $s_1$, an estimated value of the second symbol $s_2$ knowing the value of the first symbol $s_1$, is taken without having to perform an exhaustive search over all the possible values of the second symbol $s_2$ belonging to the constellation used to transmit the second symbol $s_2$. This estimated value of the second symbol $s_2$ knowing the value of the first symbol $s_1$ is denoted as $s_2^{ML}|s_1$ in the following.

Once the estimated value $s_2^{ML}|s_2$ is determined for each possible value of the first symbol $s_1$, the following metrics are calculated (03):

$$m(s_1) = \left\| y - H \begin{bmatrix} s_1 \\ s_2^{ML}|s_1 \end{bmatrix} \right\|^2 = \|r_2(s_1) - c_2(s_2^{ML}|s_1)\|^2. \quad (8)$$

Each metric corresponds to the Euclidean distance between the received signal y and a noiseless signal defined as the product of the channel matrix H by the symbol vector formed of the estimated value $s_2^{ML}|s_1$ and the corresponding value of the first symbol $s_1$.

Finally, the receiver selects (04, 05) the minimal Euclidean distance among the Euclidean distances calculated, and the most probable transmitted signal ŝ, denotes $$\hat{s} = \begin{bmatrix} s_1 \\ s_2^{ML}|s_1 \end{bmatrix},$$

defined by the estimated value $s_2^{ML}|s_1$ and the corresponding value of the first symbol $s_1$, which minimize the Euclidean distance $m(s_1)$ with respect to the M possible values of the first symbol $s_1$.

It can be shown that such a receiver provides the same symbol estimation as the exhaustive search, though its complexity is not exponential in the constellation size, but linear or near linear. This way of reducing an exponential search as an enumeration over only one of the two dimensions is not a common mechanism and is one of the specificities of an embodiment of the invention.

Particularly, it is completely different of an iterative approach where the first symbol $s_1$ would be estimated using a suboptimal hard decision based on $c_1^H y = c_1^H c_1 s_1 + n_1$, where $n_1 = c_1^H c_2 s_2 + c_1^H n$, and then subtracted to estimate the value of the second symbol $s_2$ using a second error prone hard decision based on $c_2^H y = c_2^H c_2 s_2 + c_2^H c_1 (s_1 - \hat{s}_1) + n_2$ where $n_2 = c_2^H n$.

Figure 3:
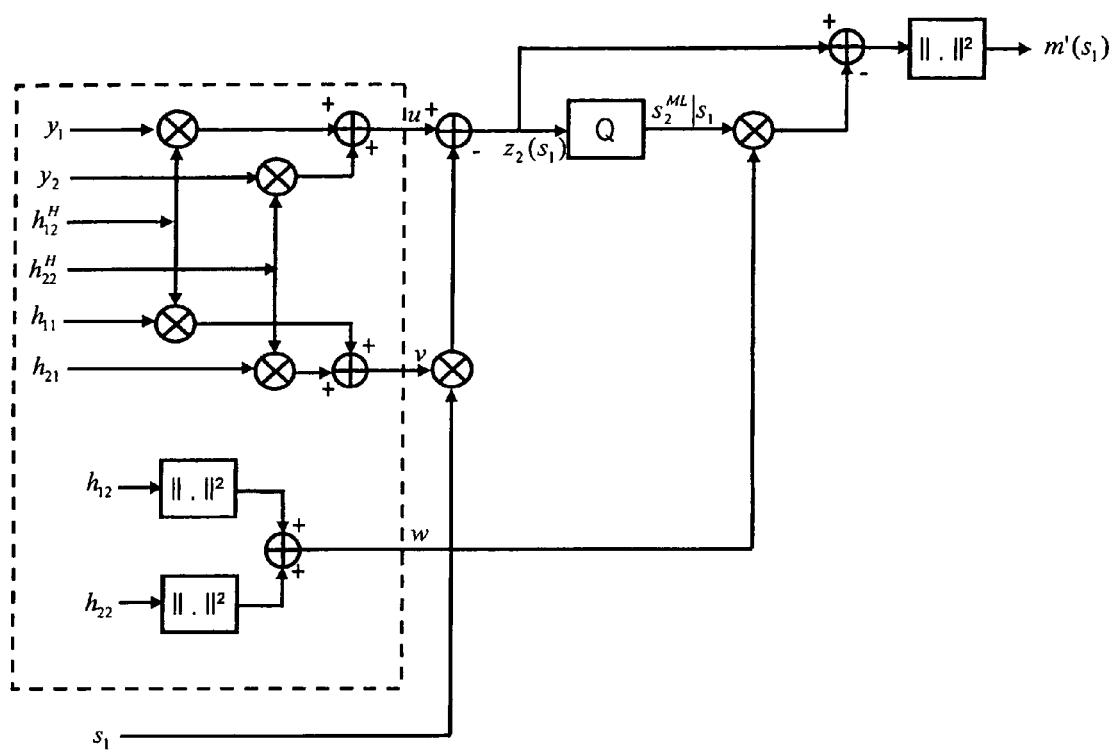
FIG. 3 shows a bloc diagram of another part of the receiver according to a second embodiment of the invention.

In a second embodiment of the invention, and with reference to FIG. 3, rather than computing $r_2(s_1)$ according to equation (5) for each possible value of the first symbol $s_1$ and multiplying it by $c_2^H$ to get the intermediate signal $z_2(s_1)$ as indicated by equation (7), the receiver first computes a first quantity $u = c_2^H y$ calculated only once per symbol period and used in equation (7) for all possible values of the first symbol $s_1$, and a second quantity $v = c_2^H c_1$ and a third quantity $w = c_2^H c_2$, which are independent of the first and second symbols values, and which remain unchanged as long as the channel responses do not change.

Once these three quantities are calculated, the intermediate signal $z_2(s_1)$ is computed for each of the M possible values of the first symbol $s_1$, where $z_2(s_1) = u - v s_1$ in this case.

The intermediate signal $z_2(s_1)$ is then used to determine the estimated value $s_2^{ML}|s_1$ of the second symbol as in the first embodiment.

The minimization on the first symbol $s_1$ of the metric $m(s_1)$ can be equivalently performed, according to the first or the second embodiment, by minimizing:

$$m'(s_1) = \left\| c_2^H \left( y - H \begin{bmatrix} s_1 \\ s_2^{ML}|s_1 \end{bmatrix} \right) \right\|^2,$$

which can be easily obtained by using the third quantity w as: $m'(s_1) = \| z_2(s_1) - w(s_2^{ML}|s_1) \|^2$, to reduces the receiver complexity.

The receiver may perform the same operations as in the first or second embodiment, but in the reverse order. Specifically, it cancels the contribution of the second symbol $s_2$ on the received signal y for all of the M possible values of the second symbol $s_2$, multiplies the resulting signal $r_1(s_2)$ by $c_1^H$ to get the intermediate signal $z_1(s_2)$ and then, it determines the best estimated value of the first symbol $s_1$ by sending the intermediate signal $z_1(s_2)$ to the threshold detector Q or by using the look-up table.

Actually, it can be shown that first and second embodiments give the same results, that is to say, the most probable transmitted signal $$\hat{s} = \begin{bmatrix} s_1^{ML}|s_2 \\ s_2 \end{bmatrix} = \begin{bmatrix} s_1 \\ s_2^{ML}|s_1 \end{bmatrix}$$

is the same, whether the receiver is run one way or the other. This property can be exploited to minimize the receiver complexity when the constellations used for the first symbol $s_1$ and the second symbol $s_2$ are not of the same size. Indeed, when the transmitted constellations are different, the receiver can choose to perform the enumeration either on the first symbol $s_1$ or on the second symbol $s_2$ so as to choose the most favorable case to reduce the complexity.

In a fourth embodiment, if the receiver complexity remains too high, it is possible to reduce the complexity of the proposed receiver further by limiting the number of hypotheses tested during the enumeration of the first or second symbol to a number of values inside a sphere belonging to the constellation, centered on the received signal y and the radius of which is equal to a predefined value $\rho$. The sphere is, for example, a one-dimensional sphere which is simply an interval.

The first step of this reduced enumeration will thus be to perform a QR decomposition of the channel matrix $H: H^H H = R^H R$, where R is an upper triangular matrix:

$$R = \begin{bmatrix} r_{11} & r_{12} \\ 0 & r_{22} \end{bmatrix}$$

In this case, if we denote as:

$$\varepsilon = \begin{bmatrix} \varepsilon_1 \\ \varepsilon_2 \end{bmatrix} = H^{-1} y,$$

by noting that $m(s) = \|y - Hs\|^2 = (\varepsilon - s)^H H^H H (\varepsilon - s) = \|R(\varepsilon - s)\|^2$, the enumeration over the second symbol $s_2$ can be limited to the values of the constellation that are such that $|s_2 - \varepsilon_2|^2 \leq \rho^2 / |r_{22}|^2$, where the predefined value $\rho$ is chosen according to the desired trade-off between performance and complexity. For large values of the predefined value $\rho$, all hypotheses will be tested and the receiver will be optimal, while for small values of the predefined value $\rho$, a smaller number of hypotheses are enumerated and the estimation may not be optimal.

The estimated value of the first symbol is, for example, calculated as in the first or second embodiment, with respect to the values of the second symbol belonging to the sphere.

It is also possible to use the same principle to limit the search when the first symbol $s_1$ is used for the enumeration by switching the column of the channel matrix H to get the matrix $G = [c_2, c_1]$ and by computing its QR decomposition as $G^H G = L^H L$ where L is upper triangular $$L = \begin{bmatrix} l_{11} & l_{12} \\ 0 & l_{22} \end{bmatrix}$$

In that case, the enumeration over the first symbol $s_1$ may be limited to the constellation symbols for which is $|s_1 - \varepsilon_1|^2 \leq \rho^2 / |l_{22}|^2$ holds.

It is also possible to first compute the matrix L and R, and to perform the enumeration depending on the relative value of $l_{22}$ and $r_{22}$. This suboptimal low-cost version of the receiver constitutes another embodiment of the invention.

In most communications systems, an error correcting code (ecc) well known by those skilled in the art, for example block code or convolutional code or turbo-code, may be used together with an interleaver to add protection on the bits of information to be transmitted, in order to improve the transmission reliability. Thus first and second symbols $s_1$ and $s_2$ are defined by a plurality of symbolic bits, according to the modulation used. Each symbolic bit is designated by its rank and is equal to 0 or 1. These symbolic bits represent the bits of information to be transmitted which have been for example coded, interleaved, and mapped.

The interleaver can either operate after the bit to complex symbol mapping (symbol interleaver) or before (bit interleaver).

The receiver can then be modified to directly provide metrics to a decoder using for example a Viterbi algorithm, as known by those skilled in the art.

In this case, in a fifth embodiment of the invention, according to one of the embodiments presented previously, the selection of the minimal Euclidean distance is performed for a plurality of subsets, each subset including all the possible values of the first symbol $s_1$ in which the symbolic bit of a predetermined rank has a predetermined value.

For example, let's consider that the first symbol is defined by a first and a second symbolic bits b0 and b1.

In the case of bit interleaver, the bit metric, calculated by the receiver for a given value, for instance 0, of the first symbolic bit b0 carried by the first symbol $s_1$, can be obtained as:

$$m(b0) = \min_{s1:b0=0} \|y-Hs\|^2,$$

where the notation $\min_{s1:b0=0}$ indicates that the minimization is not performed on the set of all possible values of the constellation, but on a subset corresponding to first symbols such that the symbolic bit b0 has value 0. The search can be performed based on the set of M metrics $m(s_1)$ as:

$$m(b0) = \min_{s_1:b=0} m(s_1).$$

The receiver also calculates the following bit metrics:

$m(b0) = \min_{s1:b0=1} \|y-Hs\|^2$, where the minimization is performed on a subset corresponding to first symbols such that the symbolic bit b0 has value 1;

$m(b1) = \min_{s1:b1=0} \|y-Hs\|^2$, where the minimization is performed on a subset corresponding to first symbols such that the symbolic bit b1 has value 0; and $m(b1) = \min_{s1:b1=1} \|y-Hs\|^2$, where the minimization is performed on a subset corresponding to first symbols such that the symbolic bit b1 has value 1.

These four bit metrics are then fed to the decoder, to generate the transmitted bits of information.

Similarly, bit metrics can be obtained for symbolic bits carried by the second symbols $s_2$ as:

$$m(b0) = \min_{s_2:b0=0} m(s_2)$$

$$m(b0) = \min_{s_2:b0=1} m(s_2)$$

$$m(b1) = \min_{s_2:b1=0} m(s_2)$$

$$m(b1) = \min_{s_2:b1=1} m(s_2)$$

Similarly, in the case of symbol interleaver, the metrics for a given value of the first symbol $s_1$ or the second symbol $s_2$, can be directly obtained as described in the first, second or third embodiment.

In a sixth embodiment of the invention, the receiver can also provide a first soft symbol $$s_1^{soft} = \frac{c_1^H y - c_1^H c_2 s_2^{ML}}{c_1^H c_1}$$

and a second soft symbol $$s_2^{soft} = \frac{c_2^H y - c_2^H c_1 s_1^{ML}}{c_2^H c_2},$$

from which bit or symbol metrics could be easily derived by a skilled in the art person.

For example, $s_2^{soft}$ and $s_1^{soft}$ are respectively the estimated value of the second symbol and the corresponding value of the first symbol forming the most probable transmitted signal $\hat{s}$.

An embodiment of the invention also applies to systems with more than two receive antennas. In this case, the received signal may be expressed as:

$$y = \begin{bmatrix} y_1 \\ \vdots \\ y_N \end{bmatrix} = \begin{bmatrix} h_{11} & h_{12} \\ \vdots & \vdots \\ h_{N1} & h_{N2} \end{bmatrix} \begin{bmatrix} s_1 \\ s_2 \end{bmatrix} + \begin{bmatrix} n_1 \\ n_2 \end{bmatrix} = Hs + n,$$

where N is the number of receive antennas.
By changing the definitions of $c_1$ and $c_2$ to:

$$c_1 = \begin{bmatrix} h_{11} \\ \vdots \\ h_{N1} \end{bmatrix} \text{ and } c_2 = \begin{bmatrix} h_{12} \\ \vdots \\ h_{N2} \end{bmatrix},$$

all of the steps of the embodiments described previously remain the same as for N=2.

From the foregoing it will be appreciated that, although specific embodiments of the invention have been described herein for purposes of illustration, various modifications may be made without deviating from the spirit and scope of the invention.

The invention claimed is:

1. A method of decoding a received signal, the method comprising:

receiving a signal with a receiver via at least one of first and second receive antennas, the signal being a function at least of a noise term matrix, of a channel matrix, and of a first and second symbols and belonging to at least a signal constellation, said channel matrix comprising a first and a second columns, said first column comprising components representing a propagation channel response between a first transmit antenna and at least the first and a second receive antennas, said second column comprising components representing the propagation channel response between a second transmit antenna and at least the first and second receive antennas, selecting with the receiver a set of possible values of the first symbol belonging to the signal constellation;

for each selected value of the first symbol performing the steps of:

estimating with the receiver the value of the second symbol using the value of the first symbol, to generate an estimated value of the second symbol; and calculating with the receiver an Euclidean distance between the received signal and a noiseless signal defined as the product of the matrix H by the vector formed of the first symbol with said selected value and by the second symbol with said estimated value;

selecting with the receiver the minimal Euclidean distance among the Euclidean distances respectively calculated for the different selected values belonging to the set or a subset of said set; and selecting with the receiver decoded first and second symbols corresponding to the selected minimum Euclidean distance.

2. Method according to claim 1, further comprising, before performing the step of estimating the value of the second symbol, at least the steps of:

calculating with the receiver a first quantity equal to the complex conjugate of the second column multiplied by the received signal;

calculating with the receiver a second quantity equal to the complex conjugate of the second column multiplied by the first column; and calculating with the receiver a third quantity equal to the complex conjugate of the second column multiplied by said second column.

3. Method according to claim 1, wherein said step of estimating the value of the second symbol comprises at least the steps of:

generating with the receiver an intermediate signal representative of the received signal in which the contribution of the first symbol is subtracted; and taking with the receiver a decision on the value of the second symbol according to the intermediate signal.

4. Method according to claim 3, wherein said decision on the value of the second symbol is taken by sending the intermediate signal to a threshold detector Q, which generates the estimated value of the second symbol according to the intermediate signal.

5. Method according to claim 3, wherein said decision on the value of the second symbol is taken by using a look-up table to find the estimated value of the second symbol.

6. Method according to claim 1, wherein said set includes all the values of the first symbol belonging to the signal constellation.

7. Method according to claim 1, wherein said set is selected inside a sphere belonging to the signal constellation, centered on the received signal and the radius of which is equal to a predefined value.

8. Method according to claim 7, wherein said sphere is such that $|s_1 - \epsilon_l|^2 \leq \rho^2/|l_{22}|^2$, $l_{22}$ being the component of the last line and column of an upper triangular matrix obtained by performing at least a QR decomposition of the channel matrix, and $\epsilon_l$ being a component of a vector equal to the inverse of the channel matrix multiplied by the received signal.

9. Method according to claim 1, wherein the first symbol is defined by a plurality of symbolic bits, each symbolic bit being designated by its rank and being equal to 0 or 1, and in that the step of selecting the minimal Euclidean distance is performed for a plurality of subsets, each subset including all the possible values of the first symbol in which the symbolic bit of a predetermined rank has a predetermined value.

10. Method according to claim 1, further comprising the steps of:

calculating with the receiver a first soft symbol $$s_1^{soft} = \frac{c_1^H y - c_1^H c_2 s_2^{ML}}{c_1^H c_1}, c_1^H$$

being the complex conjugate of the first column, and $s_2^{ML}$ being the value of the second symbol corresponding to said estimated value; and calculating with the receiver a second soft symbol $$s_2^{soft} = \frac{c_2^H y - c_2^H c_1 s_1^{ML}}{c_2^H c_2}, c_2^H$$

being the complex conjugate of the second column, and $s_1^{ML}$ being the value of the first symbol corresponding to said estimated value.

11. A receiver implementing at least said method according to claim 1.

12. Method according to claim 2, wherein said step of estimating the value of the second symbol comprises at least the steps of:

generating with the receiver an intermediate signal representative of the received signal in which the contribution of the first symbol is subtracted; and taking with the receiver a decision on the value of the second symbol according to the intermediate signal.

13. Method according to claim 2, wherein said set includes all the values of the first symbol belonging to the signal constellation.

14. Method according to claim 3, wherein said set includes all the values of the first symbol belonging to the signal constellation.

15. Method according to claim 4, wherein said set includes all the values of the first symbol belonging to the signal constellation.

16. Method according to claim 5, wherein said set includes all the values of the first symbol belonging to the signal constellation.

17. Method according to claim 2, wherein said set is selected inside a sphere belonging to the signal constellation, centered on the received signal and the radius of which is equal to a predefined value.

18. Method according to claim 3, wherein said set is selected inside a sphere belonging to the signal constellation, centered on the received signal and the radius of which is equal to a predefined value.

19. Method according to claim 4, wherein said set is selected inside a sphere belonging to the signal constellation, centered on the received signal and the radius of which is equal to a predefined value.

20. Method according to claim 5, wherein said set is selected inside a sphere belonging to the signal constellation, centered on the received signal and the radius of which is equal to a predefined value.

* * * * *